(12) United States Patent
Fina

(10) Patent No.: US 12,189,024 B1
(45) Date of Patent: Jan. 7, 2025

(54) METHODS AND SYSTEMS FOR REAL-TIME AUTOMOTIVE RADAR SENSOR VALIDATION

(71) Applicant: Waymo LLC, Mountain View, CA (US)

(72) Inventor: Michael Fina, Mountain View, CA (US)

(73) Assignee: Waymo LLC, Mountain View, CA (US)

(*) Notice: Subject to any disclaimer, the term of this patent is extended or adjusted under 35 U.S.C. 154(b) by 780 days.

(21) Appl. No.: 17/246,951

(22) Filed: May 3, 2021

(51) Int. Cl.
*G01S 13/931* (2020.01)
*B60W 30/08* (2012.01)

(52) U.S. Cl.
CPC ............ *G01S 13/931* (2013.01); *B60W 30/08* (2013.01); *B60W 2420/408* (2024.01)

(58) Field of Classification Search
CPC ........ G01S 13/931; G01S 7/40; G01S 7/4039; G01S 7/4043; B60W 30/08; B60W 2420/52; G08G 1/16; B60R 21/013; B60R 21/01; B60R 21/0134; H01Q 1/3233
USPC .......................................................... 342/70
See application file for complete search history.

(56) References Cited

U.S. PATENT DOCUMENTS

| | | | |
|---|---|---|---|
| 9,229,100 B2 | 1/2016 | Lee | |
| 10,627,480 B2 | 4/2020 | Nayyar | |
| 10,830,871 B2 | 11/2020 | Blaes | |
| 2006/0220951 A1* | 10/2006 | Thome | G01S 7/288 342/174 |
| 2016/0363648 A1 | 12/2016 | Mindell | |
| 2019/0204435 A1 | 7/2019 | Poiger | |
| 2020/0210726 A1 | 7/2020 | Yang | |
| 2020/0333454 A1 | 10/2020 | Philipp | |
| 2020/0408890 A1* | 12/2020 | Klar | G01S 13/931 |
| 2022/0196798 A1* | 6/2022 | Chen | G01S 13/89 |

FOREIGN PATENT DOCUMENTS

| | | | | |
|---|---|---|---|---|
| WO | WO 2022169460 | * | 1/2022 | .......... G01S 13/931 |
| WO | WO-2022169460 A1 | * | 8/2022 | .......... G01S 13/003 |

OTHER PUBLICATIONS

Mujica et al., "Edge and Fog Computing Platform for Data Fusion of Complex Heterogeneous Sensors", Sensors, vol. 18, Issue 11Date of Publication: Oct. 25, 2018, https://www.mdpi.com/1424-8220/18/11/3630/htm, retrieved May 3, 2021.

* cited by examiner

*Primary Examiner* — Vladimir Magloire
*Assistant Examiner* — Remash R Guyah
(74) *Attorney, Agent, or Firm* — McDonnell Boehnen Hulbert & Berghoff LLP

(57) ABSTRACT

Example embodiments relate to real-time health monitoring for automotive radars. A computing device may receive radar data from multiple radar units that have partially overlapping fields of view and detect a target object located such that the radar units both capture measurements of the target object. The computing device may determine a power level representing the target object for radar data from each radar unit, adjust these power levels, and determine a power difference between them. When the power difference exceeds a threshold power difference, the computing device may perform a calibration process to decrease the power difference below the threshold power difference or alert the vehicle, including onboard algorithms, to the reduced performance of the radar.

20 Claims, 10 Drawing Sheets

METHODS AND SYSTEMS FOR REAL-TIME AUTOMOTIVE RADAR SENSOR VALIDATION

BACKGROUND

Radio detection and ranging systems ("radar systems") are used to estimate distances to environmental features by emitting radio signals and detecting returning reflected signals. Distances to radio-reflective features in the environment can then be determined according to the time delay between transmission and reception. A radar system can emit a signal that varies in frequency over time, such as a signal with a time-varying frequency ramp, and then relate the difference in frequency between the emitted signal and the reflected signal to a range estimate. Some radar systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information can allow for the surrounding environment features to be mapped.

SUMMARY

Example embodiments describe techniques for real-time automotive radar sensor validation. Radar units can be strategically positioned on a vehicle such that multiple radars have partially overlapping fields of views that can enable real-time health monitoring techniques. Such techniques can be automatically performed by vehicle systems to maintain optimal performance by the vehicle radar system. Techniques can also involve providing alerts to the vehicle, including onboard algorithms, which indicate information about the reduced performance of the radar.

In one aspect, an example method is provided. The method involves receiving, at a computing device coupled to a vehicle, first radar data from a first radar unit and second radar data from a second radar unit. The first radar data depicts an environment according to a first field of view of the first radar unit and the second radar data depicts the environment according to a second field of view of the second radar unit where the first field of view partially overlaps with the second field of view. The method further involves detecting, by the computing device, a target object in both of the first radar data and the second radar data and determining a first power level representing the target object based on the first radar data and a second power level representing the target object based on the second radar data. The method also involves adjusting, by the computing device and using a sensitivity model, the first power level and the second power level and determining a power difference between the first power level and the second power level based on adjusting the first power level and the second power level. The method further involves, based on the power difference exceeding a threshold power difference, performing a calibration process to decrease the power difference below the threshold power difference.

In another aspect, an example system is provided. The system includes a first radar unit and a second radar unit coupled to a vehicle. The first radar unit operates according to a first field of view, the second radar unit operates according to a second field of view, and the first field of view partially overlaps with the second field of view. The system also includes a computing device, which is configured to receive first radar data from a first radar unit and second radar data from a second radar unit and detect a target object in both of the first radar data and the second radar data. The computing device is also configured to determine a first power level representing the target object based on the first radar data and a second power level representing the target object based on the second radar data, adjust, using a sensitivity model, the first power level and the second power level, and determine a power difference between the first power level and the second power level based on adjusting the first power level and the second power level. The computing device is further configured to perform a calibration process to decrease the power difference below the threshold power difference based on the power difference exceeding a threshold power difference.

In yet another example, an example non-transitory computer-readable medium configured to store instructions, that when executed by a computing system comprising one or more processors, causes the computing system to perform operations. The operations involve receiving first radar data from a first radar unit and second radar data from a second radar unit, where the first radar data depicts an environment according to a first field of view of the first radar unit and the second radar data depicts the environment according to a second field of view of the second radar unit. The first field of view partially overlaps with the second field of view. The operations further involve detecting a target object in both of the first radar data and the second radar data, determining a first power level representing the target object based on the first radar data and a second power level representing the target object based on the second radar data, adjusting, using a sensitivity model, the first power level and the second power level, and determining a power difference between the first power level and the second power level based on adjusting the first power level and the second power level. The operations also involve performing a calibration process to decrease the power difference below the threshold power difference based on the power difference exceeding a threshold power difference.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
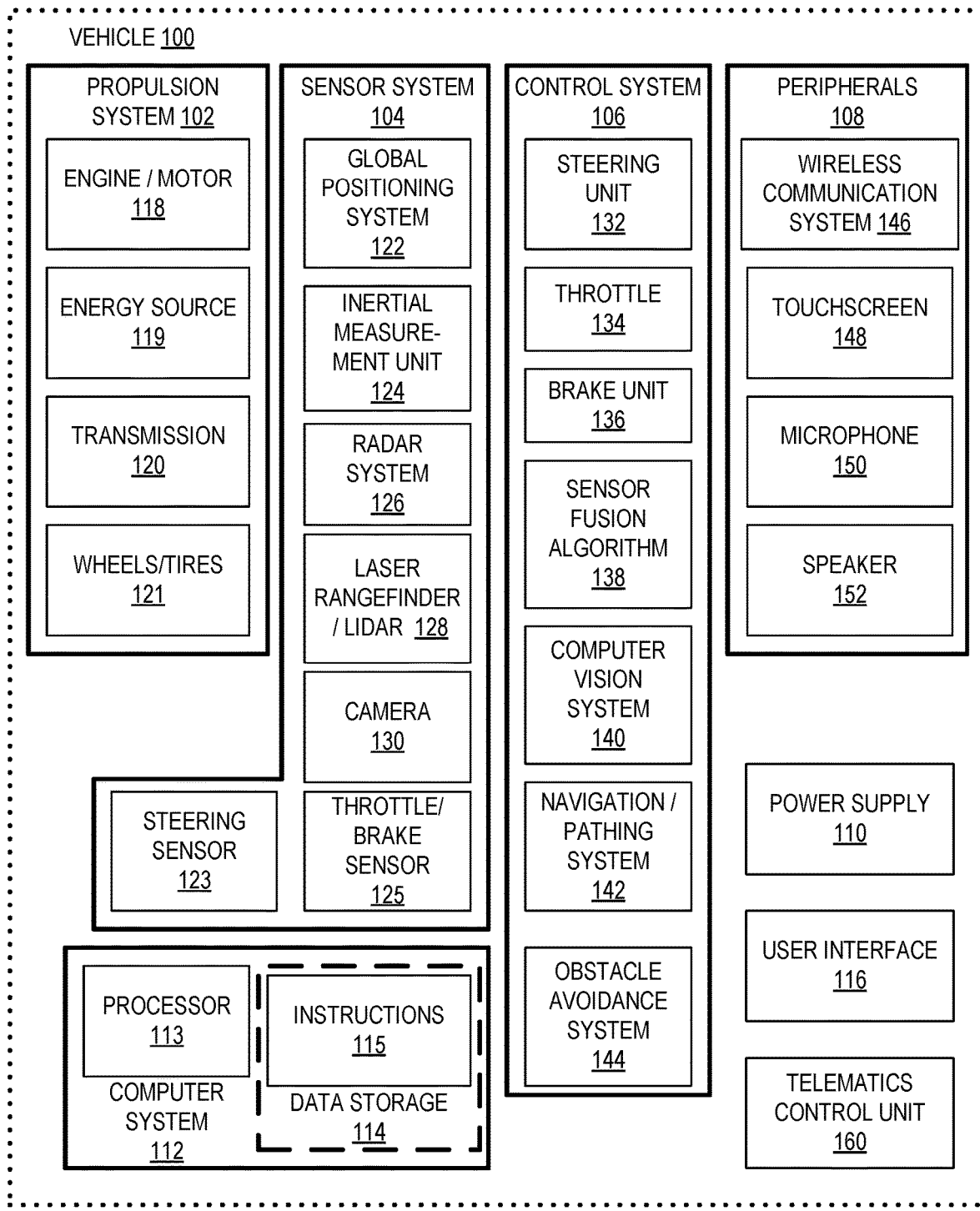
FIG. 1 is a functional block diagram illustrating a vehicle, according to one or more example embodiments.
Figure 2A:
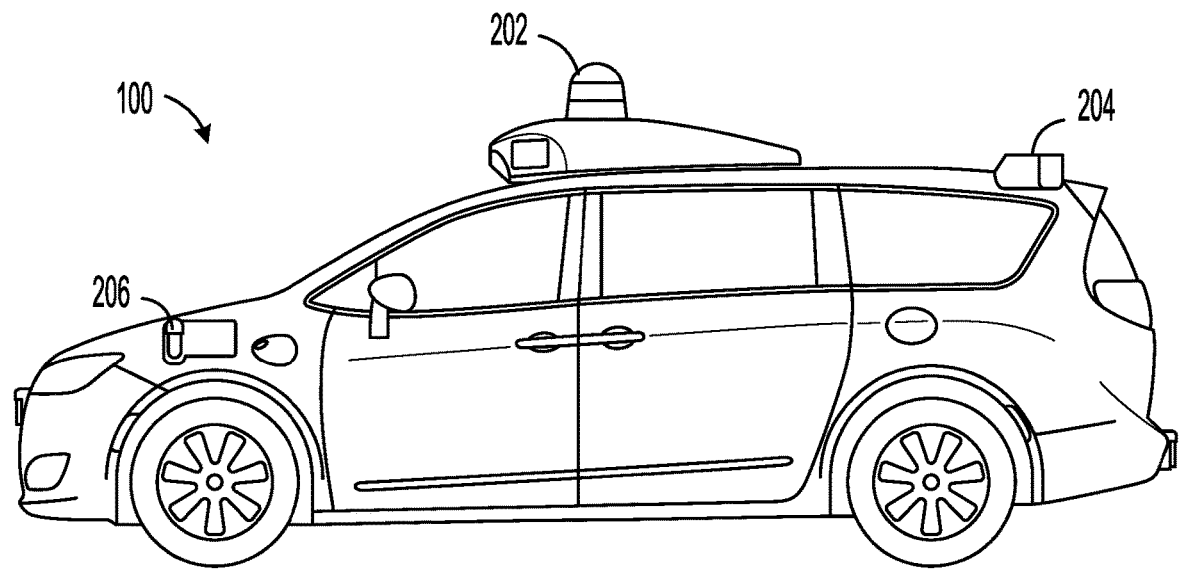
FIG. 2A illustrates a side view of a vehicle, according to one or more example embodiments.
Figure 2B:
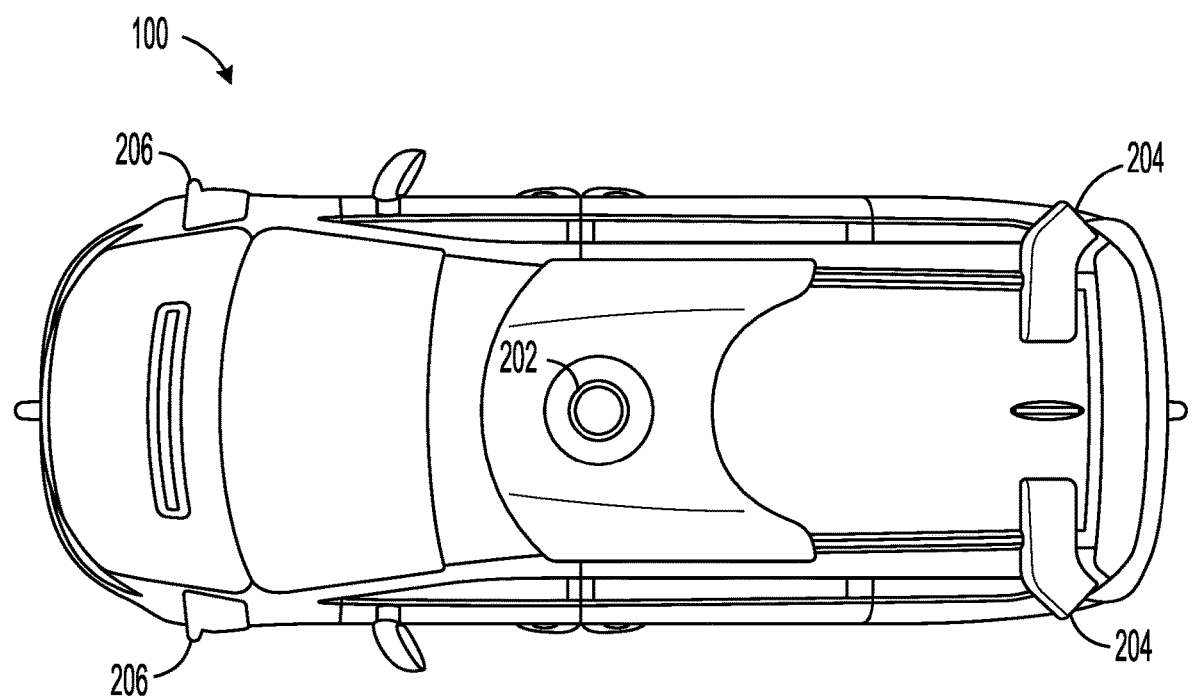
FIG. 2B illustrates a top view of a vehicle, according to one or more example embodiments.
Figure 2C:
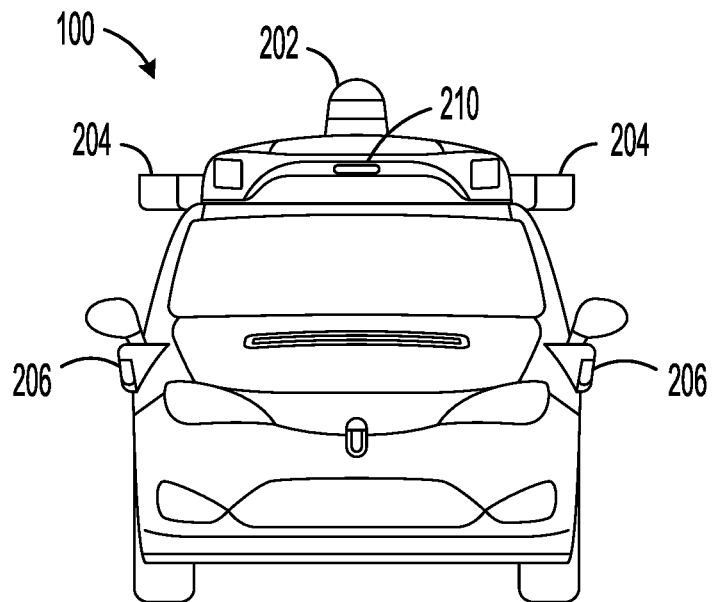
FIG. 2C illustrates a front view of a vehicle, according to one or more example embodiments.
Figure 2D:
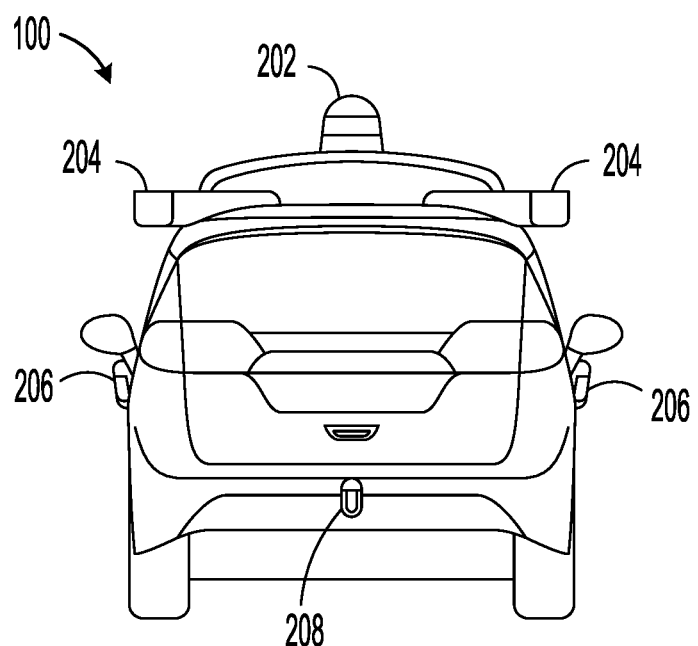
FIG. 2D illustrates a back view of a vehicle, according to one or more example embodiments.
Figure 2E:
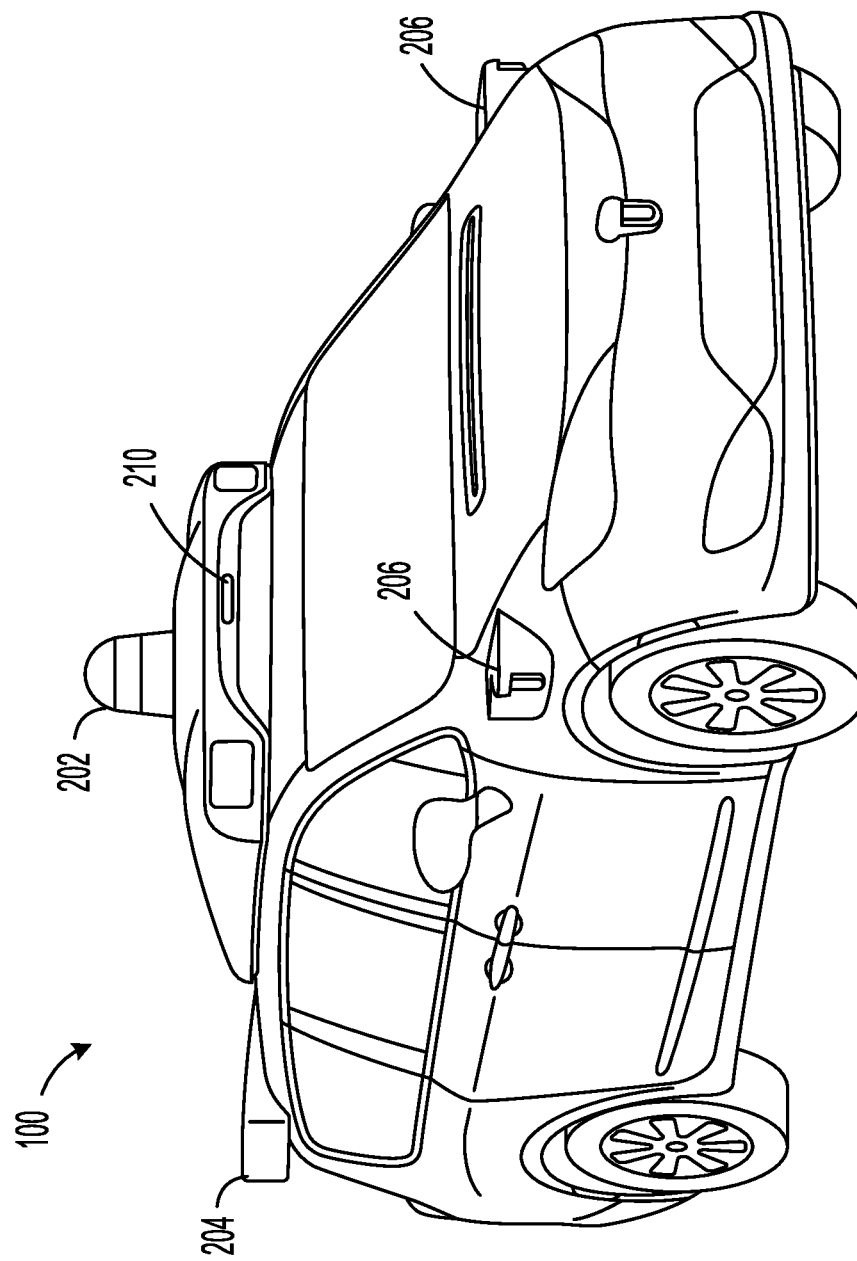
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system is used for detecting objects and estimating their positions by transmitting electromagnetic signals (i.e., radar signals) and analyzing the backscattered signals from the objects and other surfaces in the environment. The system can estimate a range for an object by transmitting short pulses and/or coded waveforms, such as a pulsed Doppler radar that involves a coherent burst of short pulses of a certain carrier frequency. In some applications, electromagnetic energy is concentrated to a particular spatial sector in the form of a beam via a parabolic reflector or an array of antenna elements associated with a radar unit.

A radar processing system (e.g., a computing device) may process radar data to generate two dimensional (2D) and/or three dimensional (3D) measurements that represent aspects of the environment, such as the positions, orientations, and movements of nearby objects and other surfaces occupying the environment near the radar system. Because a radar system can be used to measure distances and motions of nearby objects and other surfaces, vehicles are increasingly incorporating vehicle radar systems that can obtain and provide useful information for vehicle navigation, obstacle avoidance, and other vehicle operations that can boost overall vehicle safety. Radar can be used to detect and identify the positions, orientations, and movements of nearby vehicles, bicycles, pedestrians, and animals. Radar can also reveal information about other features in the vehicle's surrounding environment, such as the location, arrangement, and position of road boundaries, road conditions (e.g., smooth or bumpy surfaces), weather conditions (e.g., wet or snowy roadways), and the relative positions of traffic signs and signals. As such, radar offers a way for vehicle systems to continuously monitor and understand changes during navigation in various environments and can supplement sensor data from other types of sensors.

In some applications, a vehicle radar system can provide information aimed to assist the vehicle's driver. For instance, radar measurements may be used to generate alerts when the vehicle drifts outside its lane, when the vehicle travels too closely to another vehicle or object, and/or in other ways that can help the driver safely control the vehicle. Radar measurements can also be used to help enable autonomous or semi-autonomous operations by the vehicle. In particular, radar data can be used by control systems to understand and safely navigate the vehicle's environment in near real-time as discussed above.

Because radar can help contribute to a vehicle's understanding of the surrounding environment, it is desirable to keep radar measurements accurate. Different factors can impact the performance of individual radar units, such as sensor degradation and drift, changing environments (e.g., temperature fluctuations), physical debris impacting signal transmission or reception, and weather conditions (e.g., snow or sleet covering a portion of a radar unit's radome). With these obstacles often encountered by vehicles during navigation, there exists a demand for techniques that can help monitor and maintain the performance of a vehicle radar system.

Examples embodiments described herein relate to real-time performance health monitoring techniques for vehicle radar systems. When unoccluded, radar units with partially overlapping fields of view can offer a redundant means of measuring the response power from one or more targets located in the vehicle's surrounding environment. In particular, large metal road signs, vehicles, and other objects frequently encountered during vehicle navigation can have a large cross-section that offers useful test object characteristics for performing health monitoring techniques. Some health monitoring techniques described herein can involve response power comparisons by taking two (or more) partially overlapping field of view radars and comparing the corrected, relative return powers of the collocated detection of a particular scatterer (e.g., a metal sign).

In some applications, a sensitivity model of responsive power can be used to account for expected return power differences in azimuth offsets between the multiple radars and/or differences in center frequency or modulation parameters that may arise due to interference with ground waves or other reasons. The sensitivity model can be trained by analyzing object detections from partially overlapping radars overtime along with mounting parameters for each radar. In some embodiments, training of the sensitivity model is performed during navigation of the vehicle based on incoming sensor data. For instance, different sensors can help determine offsets and one or more offsets can depend on hardware alignment of radars on the vehicle. In other embodiments, the sensitivity model can be generated on a computing device positioned away from the vehicle and provided to the vehicle via an over-the-air update.

In addition, performance of the health monitoring technique can involve integrating coherent processing intervals (CPIs) over time to establish a reliable relative power between the overlapping radars. When performance by one of the radar units dips below a threshold (e.g., a power threshold), vehicle systems can correctively act to alert the technical team to investigate the radar's performance and/or perform another calibration technique to increase performance of that radar. Some examples also include using the identical waveform timelines and similar parameters used by the partially overlapping field of view radars to further ensure that each radar performs at a desired performance level.

Calibration techniques can vary within examples. In some instances, a calibration technique can involve temporarily suspending radar operations to fix potential issues. For example, the vehicle radar system may perform a reset or another calibration technique that temporarily limits use of one or more radars. In some cases, the vehicle may submit a request to a remote computing device that indicates the drop in performance of a radar unit and responsively receive a software update that may fix the performance of the radar unit. The remote computing device can enable one or more technicians to remotely review the operations of the vehicle radar system and provide instructions that can calibrate performance of the radar unit. In some cases, after failing recalibration efforts, the radar may be declared to fail performance metrics. The radar may be sent for repairs or further inspection as a result.

To further illustrate, a vehicle radar system may include multiple radar units arranged in partially overlapping field of view locations on a vehicle. In practice, each radar operates according to a given field of view that represents the observable area of the vehicle's environment that the radar can measure. The position and orientation of the radar on the vehicle impacts the field of view for the radar. For instance, the vehicle may include two radars positioned near the front of the vehicle with partially overlapping fields of views that measure the environment in front and partially to the sides of the vehicle. The vehicle may also include other radars positioned with partially overlapping fields of views of the surrounding environment.

The vehicle radar system and/or another processing unit may use measurements from multiple radars that have partially overlapping fields of views to perform health monitoring techniques disclosed herein. For instance, a computing device can receive radar data from multiple radars that partially overlap when measuring the environment. The radar data can be arranged as radar data cubes with voxels that represent power measurements for different surfaces in the environment. The computing device may identify and compare power measurements of the voxels within the radar data cubes that represent the overlapping section of the environment that is measured by the multiple radars. In some instances, the power measurements can be calibrated via the application of a sensitivity model designed to reduce the impacts from azimuth offsets between the multiple radars and other factors that can impact the power measurements. For example, the sensitivity model can compensate for frequency dependence to reduce the impact of multipath interference with ground waves. In some cases, specialized waveforms and/or parameters may be selected to reduce the difference between the two radar response powers in the presence of multipath interference. The vehicle radar system may adjust the waveforms and/or other parameters in response to detecting multipath interference.

In some embodiments, the comparison may initially involve the detection of one or more target objects in the environment at a location that can be measured by multiple radars simultaneously. A sign, vehicle, and/or another object with a large radar cross section can be used for the power return comparison. For example, the vehicle may utilize a single-point scatterer in the environment that produces large RCS measurements in radar returns. In particular, the vehicle radar system or another computing device can compare power returns for the target object that were captured by multiple radars over time to detect when performance of a radar degrades below a desirable level and responsively perform a calibration technique to increase performance of that radar.

Real-time health monitoring techniques disclosed herein can enable vehicle systems to identify when radar operations drop below a threshold performance level and responsively perform corrective actions to subsequently increase performance. Calibration techniques can involve adjusting one or more operational parameters used by a radar unit. For instance, input power, frequency, waveform, and/or other parameters can be adjusted. Calibration techniques can also involve providing alerts with corresponding information, such as an alert that indicates which radar is performing poorly and further information that may assist a technician to repair the particular radar.

Some examples may involve further detecting a radar operating under a desired performance level and analyzing the performance for potential causes. For instance, a computing device can compare radar returns within radar data cubes and/or 2D images (e.g., range Doppler image) with previously stored data that is organized in a way that helps identify causes for radar operation issues. In some cases, the decrease in power returns obtained by the radar may indicate debris or precipitation is located on the radome protecting the radar. As a result, vehicle systems may provide an alert that indicates the radome requires cleaning and/or initiate an automatic process that helps remove the debris or precipitation. For example, the radome may include a heating option, pressurized air blowing device, a fan, and/or a wiper that can be used to help remove the debris or precipitation.

In some cases, a vehicle may utilize additional sensors to assist with real-time health monitoring techniques. For example, a camera may be used to capture images of a target object that is also used for comparing power returns by partially overlapping radars. The camera or another type of sensor can also be used to determine that both radars are unoccluded at the time at which performance of the radars with overlapping fields of views can be compared. Sensor measurements can be used to calibrate radar performance in some implementations.

Some examples further involve vehicle systems providing health monitoring information to other computing systems, such as a central database. Each vehicle within a fleet may provide information that indicates occurrences when a radar's performance dropped below a threshold performance level. Each occurrence may be provided with parameters associated with the occurrence, such as when the radar performance dropped, which radar unit, and the solution that boosted performance, among other information. Over time, the central database may collect occurrences and other statistics from various vehicles, which may enable trends to be detected and identified. In some cases, potential solutions can be derived based on the trends that help minimize suboptimal performance by vehicle radar systems. In addition, the statistics can also be used to help identify particular radar models or other components that appear to have more issues than other options.

The following detailed description may be used with one or more radar units having one or multiple antenna arrays. The one or multiple antenna arrays may take the form of a single-input single-output single-input, multiple-output (SIMO), multiple-input single-output (MISO), multiple-input multiple-output (MIMO), and/or synthetic aperture radar (SAR) radar antenna architecture. In some embodiments, example radar unit architecture may include a plurality of "dual open-ended waveguide" (DOEWG) antennas. The term "DOEWG" may refer to a short section of a horizontal waveguide channel plus a vertical channel that splits into two parts. Each of the two parts of the vertical channel may include an output port configured to radiate at least a portion of electromagnetic waves that enters the radar unit. Additionally, in some instances, multiple DOEWG antennas may be arranged into one or more antenna array's. Some example vehicle radar systems may be configured to operate at an electromagnetic wave frequency in the W-Band (e.g., 77 Gigahertz. (GHz)), which can represent electromagnetic waves on the order of millimeters (e.g., 1 mm or 4 mm). Such antennas may be compact (typically with rectangular form factors), efficient (i.e., with little of the 77 GHz energy lost to heat in the antenna or reflected back into the transmitter electronics), low cost and easy to manufacture (i.e., radar systems with these antennas can be made in high volume).

An antenna array may involve a set of multiple connected antennas that can work together as a single antenna to transmit or receive signals. By combining multiple radiating elements (i.e., antennas), an antenna array may enhance the performance of the radar unit when compared to radar units that use non-array antennas. In particular, a higher gain and narrower beam may be achieved when a radar unit is equipped with one or more antenna arrays. As a result, a radar unit may be designed with antenna arrays in a configuration that enables the radar unit to measure particular regions of the environment, such as targeted areas positioned at different ranges (distances) from the radar unit.

Radar units configured with antenna arrays can differ in overall configuration. For instance, the number of arrays, position of arrays, orientation of arrays, and size of antenna arrays on a radar unit can vary in examples. In addition, the quantity, position, alignment, and orientation of radiating elements (antennas) within an array of a radar unit can also vary. As a result, the configuration of a radar unit may often depend on the desired performance for the radar unit. For example, the configuration of a radar unit designed to measure distances far from the radar unit (e.g., a far range of the radar unit) may differ compared to the configuration of a radar unit used to measure an area nearby the radar unit (e.g., a near field of the radar unit).

To further illustrate, in some examples, a radar unit may include the same number of transmission antenna arrays and reception antenna arrays (e.g., four arrays of transmission antennas and four arrays of reception antennas). In other examples, a radar unit may include a number of transmission antenna arrays that differs from the number of reception antenna arrays (e.g., 6 transmission antenna arrays and 3 reception antenna arrays). In addition, some radar units may operate with parasitic arrays that can control radar transmissions. Other example radar units may include one or multiple driven arrays that have radiating elements connected to an energy source, which can have less overall energy loss when compared to parasitic arrays.

Antennas on a radar unit may be arranged in one or more linear antenna arrays (i.e., antennas within an array are aligned in a straight line). For instance, a radar unit may include multiple linear antenna arrays arranged in a particular configuration (e.g., in parallel lines on the radar unit). In other examples, antennas can also be arranged in planar arrays (i.e., antennas arranged in multiple, parallel lines on a single plane). Further, some radar units can have antennas arranged in multiple planes resulting in a three dimensional array. A radar unit may also include multiple types of arrays (e.g., a linear array on one portion and a planar array on another portion). In addition, radar units may have different functionality and operational characteristics. For example, a radar unit may be configured for long-range operation and another radar unit may be configured for short-range operation. A radar system may use a combination of different radar units to measure different areas of the environment. Accordingly, it may be desirable for the signal processing of short-range radar units to be optimized for radar reflections in the near-field of the radar unit.

Referring now to the figures, FIG. 1 is a functional block diagram illustrating vehicle 100, which may operate fully or partially in an autonomous mode when performing disclosed operations. In particular, vehicle 100 may operate in an autonomous mode without human interaction through receiving control instructions from a computing system (e.g., a vehicle control system). As part of operating in the autonomous mode, vehicle 100 may use sensors (e.g., sensor system 104) to detect and possibly identify objects of the surrounding environment to enable safe navigation. In some example embodiments, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, peripherals 108, power supply 110, computer system 112, data storage 114, and user interface 116. The subsystems and components of vehicle 100 may be interconnected in various ways (e.g., wired or secure wireless connections) and may include more or less subsystems than illustrated in FIG. 1. In addition, the functions of vehicle 100 described herein can be divided into additional functional or physical components and/or combined into fewer functional or physical components within implementations.

Propulsion system 102 may provide powered motion for vehicle 100 and can include one or more engine/motor(s) 118, energy source 119, transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. Energy source 119 may be used to power one or more systems of vehicle 100 (e.g., engine/motor 118) and can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheel. Transmission 120 may transmit mechanical power from the engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121. Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In addition, sensor system 104 may also include sensors configured to monitor internal systems of the vehicle 100 (e.g., $O_2$ monitors, fuel gauge, engine oil temperature, condition of brakes).

GPS 122 may include one or more transceivers operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar system 126 may use radio signals to sense objects (e.g., radar signals), including the speed and heading of the objects, within the local environment of vehicle 100. As such, radar system 126 may include one or more radar units equipped with one or more antennas configured to transmit and receive radar signals as discussed above. In some implementations, radar system 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more image capture devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, the angle of the gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure from Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may securely and wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using Wi-Fi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 further includes power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors. In addition, vehicle 100 may also include telematics control unit (TCU) 160. TCU 160 may enable vehicle connectivity and internal passenger device connectivity through one or more wireless technologies.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types of sensors with each sensor configured to capture information from the surrounding environment or perform other operations (e.g., communication links, obtain overall positioning information). For example, sensor positions 202-210 may serve as locations for any combination of one or more cameras, radar units, LIDAR units, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted on top the roof of vehicle 100. Additionally, other mounting locations are possible within examples. In some situations, sensors coupled at these locations can provide data that can be used by a remote operator to provide assistance to vehicle 100.

Figure 3:
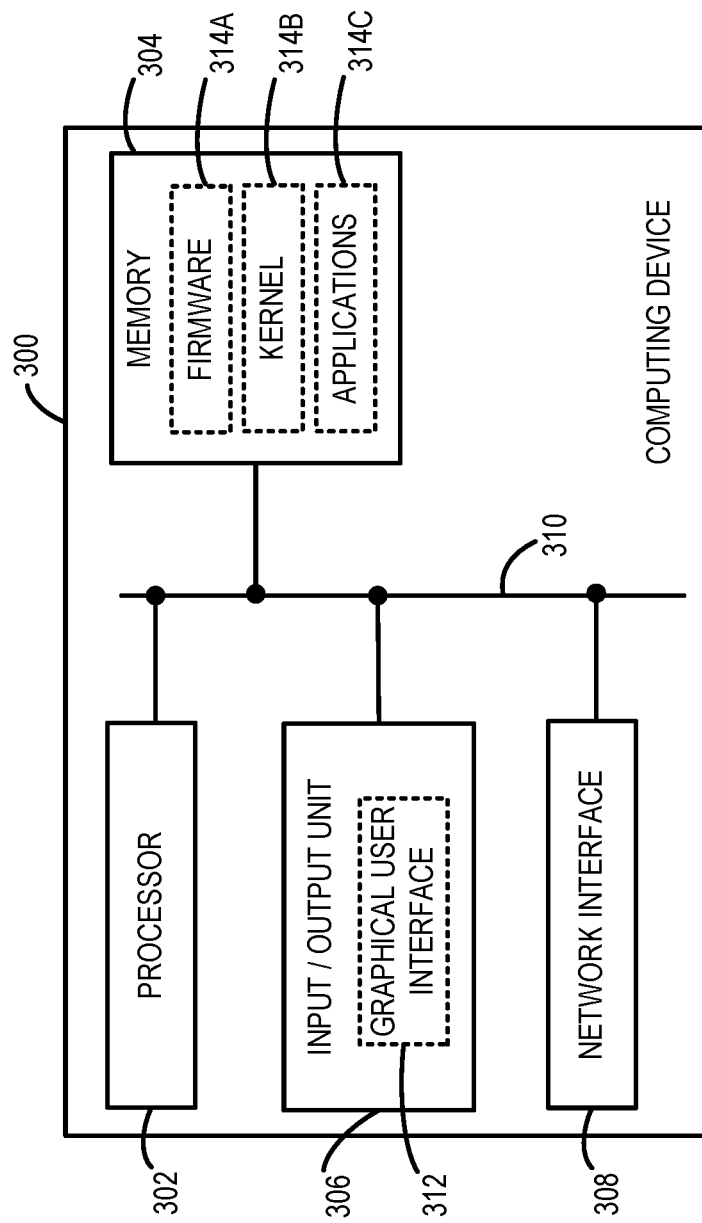
FIG. 3 is a simplified block diagram for a computing system, according to one or more example embodiments.

FIG. 3 is a simplified block diagram exemplifying computing device 300, illustrating some of the components that could be included in a computing device arranged to operate in accordance with the embodiments herein. Computing device 300 may be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104, develop control instructions, enable wireless communication with other devices, and/or perform other operations. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processor 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processor 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 302 may be one or more single-core processors. In other cases, processor 302 may be one or more multi-core processors with multiple independent processing units. Processor 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, rewritable compact discs (CDs), rewritable digital video discs (DVDs), and/or tape storage, as just a few examples. Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processor 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more userspace software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may be displayable one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wi-Fi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wi-Fi interfaces. In some embodiments, network interface 308 may enable computing device 300 to connect with one or more vehicles to allow for remote assistance techniques presented herein.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing device 300 may enable the performance of embodiments described herein, including adverse road conditions detection techniques using radar or another type of sensor data.

Figure 4:
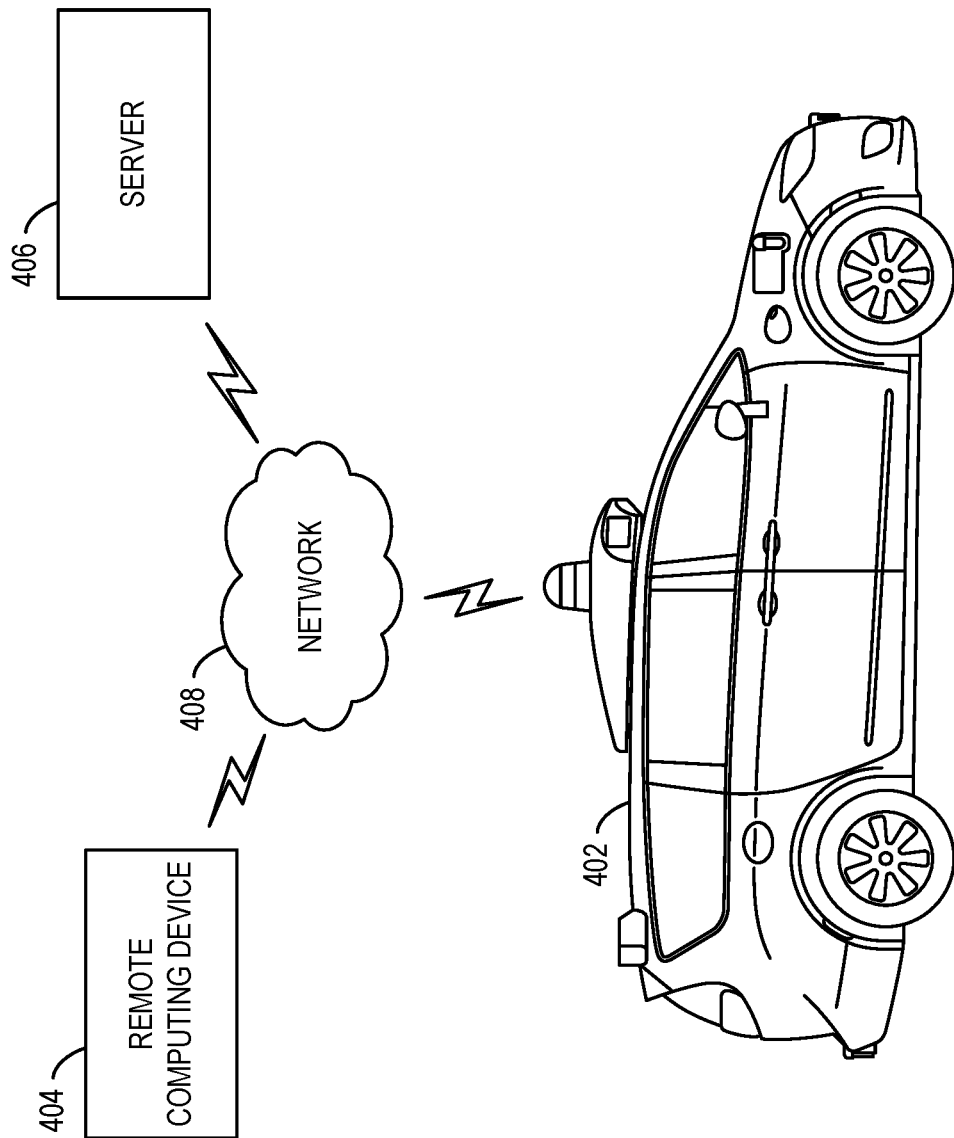
FIG. 4 is a system for wireless communication between a vehicle and computing devices, according to one or more example embodiments.

FIG. 4 is a system for wireless communication between computing devices and a vehicle, according to one or more example embodiments. Particularly, system 400 is shown with vehicle 402, remote computing device 404, and server 406 communicating wirelessly via network 408. System 400 may include other components not shown within other embodiments, such as firewalls and multiple networks, among others.

Vehicle 402 may be configured to autonomously (or semi-autonomously) transport passengers or objects (e.g., cargo) between locations and may take the form of any one or more of the vehicles discussed above, including passenger vehicles, cargo shipping vehicles (e.g., trucks), farming and manufacturing vehicles, and dual-purpose vehicles. When operating in autonomous mode, vehicle 402 may navigate to pick up and drop off passengers (or cargo) between desired destinations by relying on sensor measurements to detect and understand the surrounding environment. In some embodiments, vehicle 402 can operate as part of a fleet, which may be managed by a central system (e.g., remote computing device 404 and/or other computing devices).

Remote computing device 404 may represent any type of device or devices configured to perform operations, including but not limited to those described herein. The position of remote computing device 404 relative to vehicle 402 can vary within examples. For instance, remote computing device 404 may have a remote position from vehicle 402, such as operating inside a physical building. In some implementations, operations described herein that are performed by remote computing device 404 may be additionally or alternatively performed by vehicle 402 (i.e., by any system(s) or subsystem(s) of vehicle 200).

In addition, operations described herein can be performed by any of the components communicating via network 408. For instance, remote computing device 404 may determine a route and/or operations for vehicle 402 to execute using information from vehicle 402 and/or other external sources (e.g., server 406). In some embodiments, remote computing device 404 may generate a GUI to display one or more selectable options for review by a remote operator.

Server 406 may be configured to wirelessly communicate with remote computing device 404 and vehicle 402 via network 408 (or perhaps directly with remote computing device 404 and/or vehicle 402). As such, server 406 may represent any computing device configured to receive, store, determine, and/or send information relating to vehicle 402 and the remote assistance thereof. Server 406 may be configured to perform any operation(s), or portions of such operation(s), that is/are described herein as performed by remote computing device 404 and/or vehicle 402. Some implementations of wireless communication related to remote assistance may utilize server 406, while others may not.

Network 408 represents infrastructure that can enable wireless communication between computing devices, such as vehicle 402, remote computing device 404, and server 406. For example, network 408 can correspond to a wireless communication network, such as the Internet or a cellular wireless communication network. The various systems described above may perform various operations. These operations and related features will now be described.

In some embodiments, vehicle 402 may communicate with remote computing device 404 and/or server 406 via network 408 to receive and/or provide information related to health monitoring techniques described herein. For example, vehicle 402 may communicate occurrences when radar performance degrades and corresponding solutions during navigation to server 406 for storage and subsequent access by other vehicles. Some examples can involve vehicle 402, remote computing device 404, and/or server 406 performing aggregation of statistics that can be used to gain insight into sensitivity variations of radars. For example, server 406 can store statistics that enable comparing the sensitivity of radar that originate from different lots. Similarly, performance of different models or production batches of radars can be monitored via aggregation of information from various vehicles.

Vehicle radar systems can be implemented as SAR systems that can emit signals at a scene of targets and measure the voltage returned from the scene. From these voltages, one or more RCS(s) can be determined with each representing a measure of how "large" a target (or surface) appears in a radar image. In particular, high RCS values can appear as bright targets, whereas dim targets have low RCS values. In environments encountered by vehicles, buildings, signs, other vehicles, and other objects with rough surfaces can scatter large amounts of signals back toward the radar, which produces high RCS values. Conversely, since the ground is relatively flat, it may scatter a larger portion away from radar units of the vehicle radar system, which results in a low RCS measurements for the ground. By obtaining different RCS measurements for surfaces in the surrounding environment, vehicle radar can create 2D images and/or 3D reconstructions of the vehicle's environment that shows positions and arrangement of objects relative to the vehicle.

As a vehicle navigates to a target destination, the vehicle radar system transmits signals sequentially and receives reflections of the signals, which can then be digitized and stored for subsequent processing. Because transmission and subsequent reception occurs at different times, they map to different positions, which enables the ordered combination of received signals to build a virtual aperture that extends further than the physical antenna array's width. As a result, the vehicle radar system can be used to produce 2D and/or 3D mapping of the environment.

Operations may involve initially defining a 3D mapping of scene elements (e.g., a reconstruction of the environment), which represent the volume of space within which targets exist. Each element of the array can be a cubical voxel (within a radar data cube) representing the probability (a density) of a reflective surface being at that location in space. In some instances, 2D images are used rather than 3D mapping to decrease computational resources required. Initially, each voxel within a radar data cube representing a radar's field of view may have a density of zero. For each captured waveform, the entire volume can be iterated and, for a given waveform and voxel, the distance from the position represented by that voxel to the antenna or antennas used to capture that waveform is calculated with the distance representing a time delay into the waveform. The sample value at that position in the waveform can then be added to the voxel's density value, which represents a possible echo from a target at that position. Note there can be several optional approaches here, depending on the precision of the waveform timing, among other things. For example, if phase cannot be accurately determined, the envelope magnitude (with the help of a Hilbert transform) of the waveform sample might be added to the voxel. If waveform polarization and phase are known and are accurate enough, then these values might be added to a more complex voxel that holds such measurements separately. After all waveforms have been iterated over all voxels, the basic SAR processing may be complete.

After performing the above processes, the vehicle radar system may decide what voxel density value represents a solid object. As such, voxels representing power density below a power threshold may be ignored. The threshold should be higher than the peak energy of any signal wave to prevent the wave peak from appearing as a sphere (or ellipse, in the case of multistatic operation) of false "density" across the entire volume. Thus to detect a point on a target, at least two different antenna echoes from that point may be used which may lead to radar units using large numbers of antennas to properly characterize a target object. The voxels that passed the threshold criteria can be visualized in 2D or 3D. Optionally, added visual quality may be added by using a surface detection algorithm like marching cubes.

Range bins are a scheme in which a digital radar uses a set of range gates to chop up the return trace into segments and sum the value for each segment into an associated memory "bin". By using memory bins, the vehicle radar system or another processing unit (e.g., computing device 300) can inspect the bins to see where a target is along the trace and track the target's range. The processing unit can also sum up values from trace to trace relative to an average level and, since noise will tend to fluctuate around the average level, the contents of most of the range bins may remain at the average level. As such, the vehicle radar system can keep track of the average noise level in the range bins and adjust the noise threshold accordingly, a scheme known as "constant false alarm rate (CFAR)". When there is a return signal in a range bin, the signal can tend to add up over time, which makes it easier to differentiate from the noise. If the signal shows up in two or more adjacent bins, the radar can also interpolate between the two to get a more accurate range estimate.

Figure 5B:
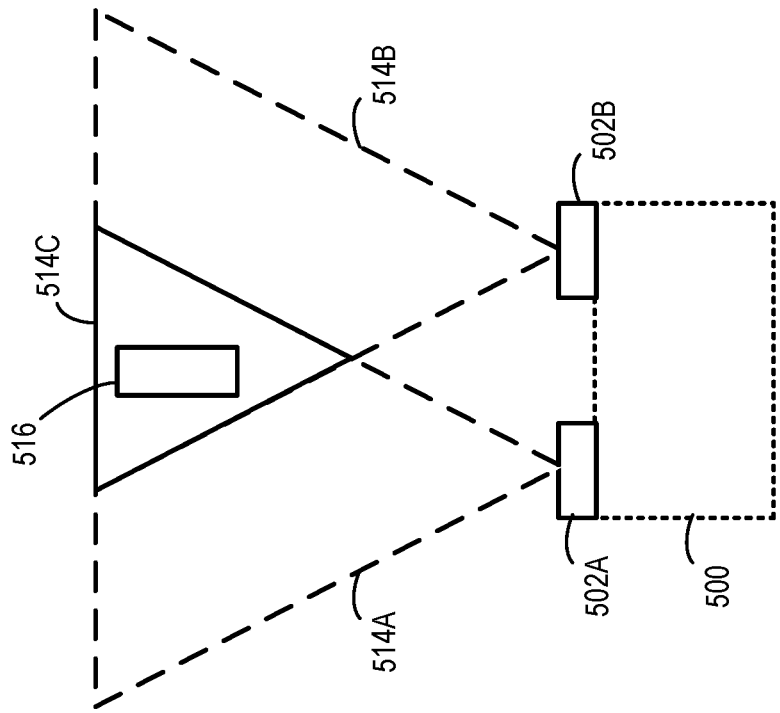
FIG. 5B illustrates the vehicle radar system performing real-time automotive radar sensor validation using front-facing radar units, according to one or more example embodiments.
Figure 5A:
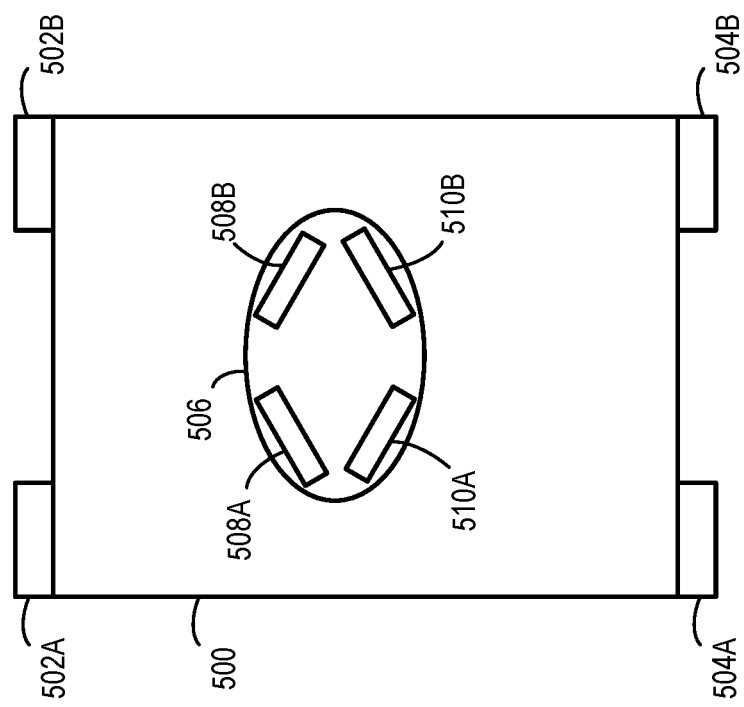
FIG. 5A illustrates a vehicle radar system arrangement, according to one or more example embodiments.

FIG. 5A illustrates a vehicle radar system arrangement, according to one or more example embodiments. As shown in the example illustration, the vehicle radar system for vehicle 500 includes two forward-facing radar units (radar unit 502A and radar unit 502B), two rear-facing radar units (radar unit 504A and radar unit 504B), and four radar units (radar unit 508A, radar unit 508B, radar unit 508C, and radar unit 508C) positioned in dome 506 on the roof of vehicle 500. In other examples, the layout of the vehicle radar system on vehicle 500 can differ in various ways. For instance, the vehicle radar system may include more or fewer radar units with other positions and orientations on the vehicle. In addition, one or more radars can be mounted on a mechanical mount that enables physically adjusting the position and/or orientation of the radar on vehicle 500.

The vehicle radar system on vehicle 500 can perform radar health monitoring operations disclosed herein. The performance of operations can involve execution by one or more computing devices, which can be positioned on vehicle 500 and/or remotely from vehicle 500. In addition, vehicle 500 can take on various forms in examples. For instance, vehicle 500 may be implemented as vehicle 100 shown in FIGS. 1, 2A, 2B, 2C, and 2D or vehicle 402 shown in FIG. 4.

During navigation of vehicle 500, vehicle systems may monitor radar health using partially overlapping field of view radars. The monitoring can occur periodically or continuously within examples. In some examples, the vehicle radar system may be scheduled to perform automotive radar sensor validation on a periodic loop (e.g., every 10 seconds). In some instances, the performance of a disclosed technique may depend on the environment of vehicle 500. For instance, the sensor system of vehicle 500 may perform radar sensor validation when one or more targets are present in the environment that can provide high power returns for analyzing radar performance. The vehicle radar system can also perform radar health monitoring techniques continuously.

Each radar positioned on vehicle 500 can operate according to a field of view that represents the observable area that the radar can measure. The field of view for a radar can describe the angle through which the radar can transmit and receive electromagnetic radiation. Within examples, radars can be used to measure different ranges using various beam widths. In addition, the vehicle radar system can adjust operational parameters used by one or more radar units, such as changing waveform, frequency, and pulse rate, etc.

FIG. 5B illustrates the vehicle radar system of vehicle 500 performing real-time automotive radar sensor validation using radar unit 502A and radar unit 502B. In the example embodiment, radar unit 502A and radar unit 502B are front-facing radars positioned on the front of vehicle 500 with field of views that partially overlap. In particular, field of view 514A for radar unit 502A extends out to measure the front left area positioned in front of vehicle 500 and partially overlaps with field of view 514B for radar unit 502B, which extends out to measure the front right area positioned in front of vehicle 500. The overlapping region is defined as section 514C and represents a portion of the environment in front of vehicle 500 that both radar unit 502A and radar unit 502B can simultaneously obtain measurements from.

As further shown in FIG. 5B, target object 516 is positioned in section 514C positioned in front of vehicle 500. When located in the overlapping region (i.e., section 514C), the vehicle radar system and/or another computing device can perform radar health monitoring techniques using measured radar returns of target object 516. In some embodiments, target object 516 may be a vehicle (e.g., a car or a truck), a traffic sign, or another type of object that can provide test object characteristics for checking performance of radar units 502A, 502B.

To analyze performance of radar units 502A, 502B, a computing device may use measurements of target object 516 from both radars. In particular, target object 516 can provide a large cross-section that can be used for health monitoring of radar unit 502A and radar unit 502B. For example, a computing device can receive radar data from both radar unit 502A and radar unit 502B. Radar unit 502A and radar unit 502B may be both transmitting signals into the environment of a vehicle according to a particular center frequency and using specific waveform parameters (e.g., linear frequency modulated (LFM) waveform parameters). The returns of the environment can be calibrated and compared to identify when either radar unit 502A or radar unit 502B is performing below a desired performance level.

In some examples, a computing device can compare power levels represented by voxels within radar data cubes generated based on radar returns from radar unit 502A and radar unit 502B, respectively. For example, the computing device can detect and identify particular voxels within each radar data cube that represent power level measurements from target object 516 and compare these power level measurements across multiple intervals. In some examples, these power levels can be adjusted using a sensitivity model that applies one or more offsets to correct for expected differences in power returns caused by mounting orientations for radar units 502A, 502B, and can help compensate for frequency dependence caused by multipath interference with ground waves.

When the power difference between corrected power levels representing target object 516 exceeds a threshold power difference, the computing device may initiate a calibration process aiming to decrease the power difference between radar unit 502A and 502B. The calibration process can vary within examples and may depend on the degree of difference in power. In some instances, the computing device may produce one or more alerts that can assist technicians in identifying which radars may need manual calibration or repair. In addition, in some embodiments, vehicle 500 may include systems that can perform radar calibration and/or radome cleaning techniques. In such cases, vehicle 500 may perform one or more techniques to increase the performance of radars.

Figure 5C:
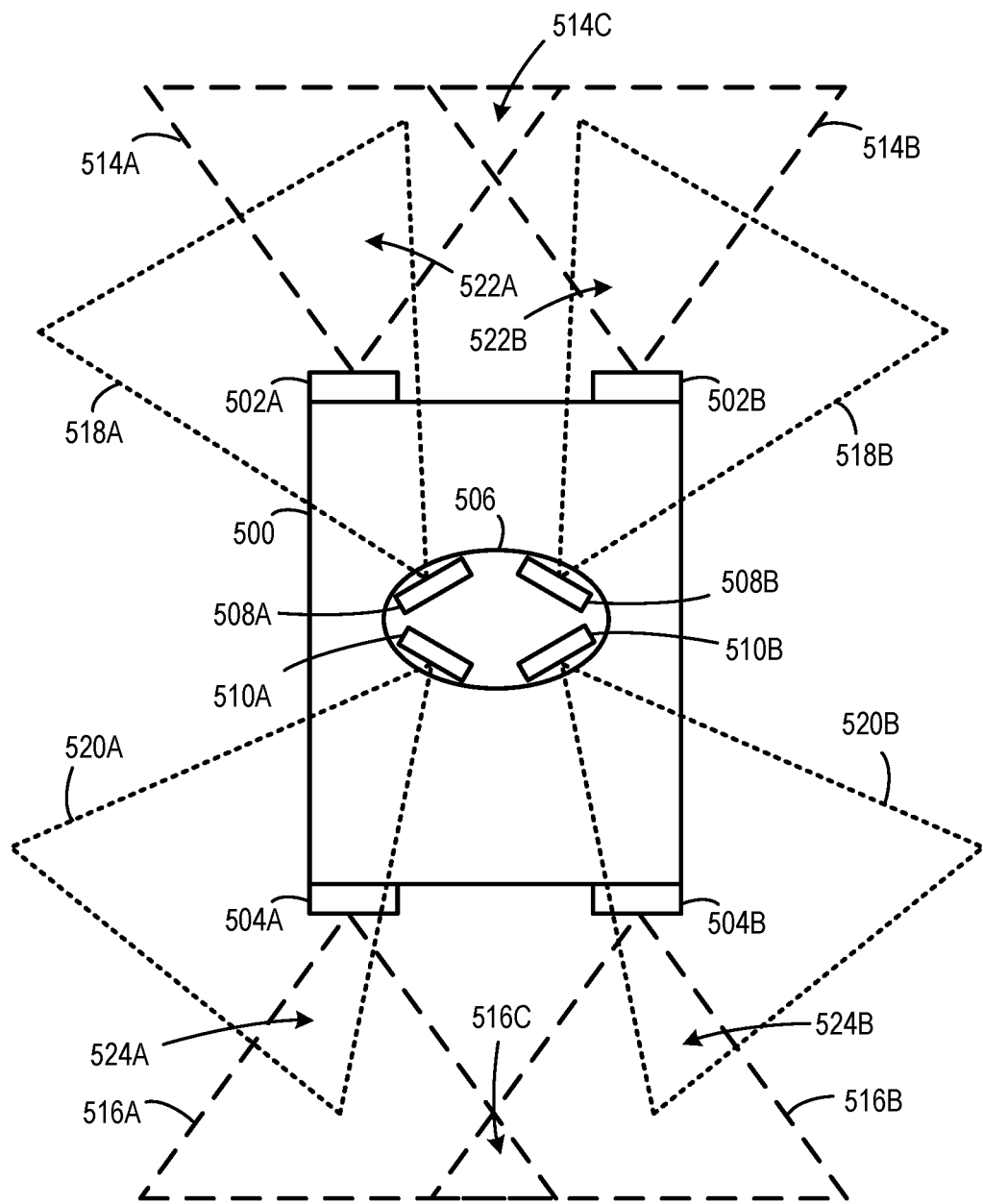
FIG. 5C illustrates the vehicle radar system performing real-time automotive radar sensor validation around the vehicle, according to one or more example embodiments.

FIG. 5C illustrates the vehicle radar system performing real-time automotive radar sensor validation around vehicle 500. The arrangement of radar units 502A-510B can allow for real-time health monitoring of the radar system. To further show how real-time health monitoring can be performed, the field of views of radar units 502A-510B are shown to illustrate how the field of view for multiple radar units can partially overlap. In other examples, radar units 502A-510B can have other arrangements that result in different overlapping combinations. In addition, some radar units 502A-510B may be positioned on mechanical fasteners that can adjust the orientation and the field of view of the radar unit. For example, dome 506 may rotate to adjust the orientation of radar units 508A, 508B, 510A, and 510B.

As similarly shown in FIG. 5B, radar units 502A, 502B are positioned near the front of vehicle 500, which results in field of view 514A for radar unit 502A and field of view 514B for radar unit 502A partially overlapping at section 514C. In addition, radar unit 508A positioned in dome 506 operates with field of view 518A that partially overlaps with field of view 514A of radar unit 502A. With such an arrangement, both radar unit 502A and radar unit 508A can obtain measurements of surfaces positioned in section 522A located in front of vehicle 500. Similarly, radar unit 508B positioned in dome 506 operates with field of view: 518B, which partially overlaps with field of view 514B of radar unit 502B. As a result, both radar unit 502B and radar unit 508B can obtain measurements of surfaces positioned in section 522B located in front of vehicle 500.

Rear-facing radar units 504A, 504B are shown positioned to the rear of vehicle 500. Radar unit 504A operates with field of view 516A that extends to measure an area positioned behind and to the left of vehicle 500. Radar unit 504B operates with field of view 516B that extends to measure an area positioned behind and to the right of vehicle 500. Field of view 516A and field of view 516B partially overlap at section 516C. Thus, radar unit 504A and radar unit 504B are both able to use radar to measure section 516C.

In addition, radar unit 510A positioned in dome 506 operates with field of view 520A that partially overlaps with field of view 516A of radar unit 504A. With such an arrangement, both radar unit 504A and radar unit 510A can obtain measurements of surfaces positioned in section 524A located behind vehicle 500. Similarly, radar unit 510B positioned in dome 506 operates with field of view 520B, which partially overlaps with field of view 516B of radar unit 504B. As a result, both radar unit 504B and radar unit 510B can obtain measurements of surfaces positioned in section 524B located behind vehicle 500. In some examples, three or more radars can have partially overlapping fields of views. As such, health monitoring techniques can involve comparing power returns from these radars.

Some examples may involve transforming radar data from radar coordinates systems to a vehicle coordinate system (a vehicle frame). Detections can be transformed from the radar frame to the vehicle frame using mount calibrations, such as the angle of the radars relative to the vehicle body front. In some cases, the mount calibrations may have errors and could require recalibration. Vehicle systems may monitor the mount calibrations and provide adjustments and/or alerts when errors are detected. As such, the comparison of spatial coordinates between two or more radar detections can take place after converting from individual radar frames to the vehicle frame in some examples.

Figure 6:
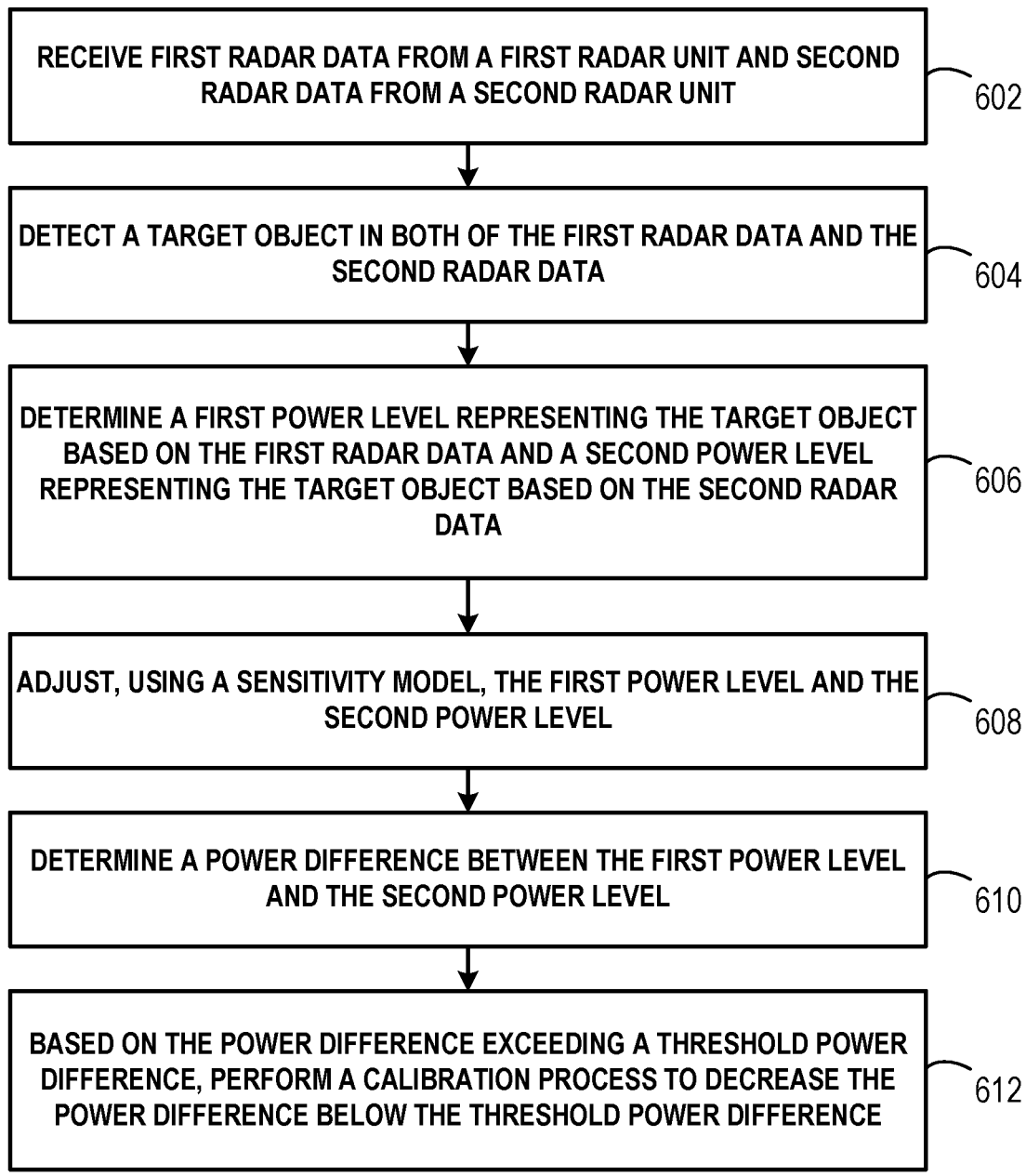
FIG. 6 is a flow chart of a method for performing real-time automotive radar sensor validation, according to one or more example embodiments.

FIG. 6 is a flow chart of a method for performing real-time automotive radar sensor validation, according to one or more example embodiments. Method 600 may include one or more operations, functions, or actions, as depicted by one or more of blocks 602, 604, 606, 608, 610, and 612, each of which may be carried out by any of the systems shown in prior figures, among other possible systems.

Those skilled in the art will understand that the flow charts described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

At block 602, method 600 involves receiving first radar data from a first radar unit and second radar data from a second radar unit. For instance, the vehicle radar system or another computing device coupled to a vehicle may receive radar returns from the different radar units positioned on the vehicle. The first radar data can depict an environment of the vehicle according to a first field of view of the first radar unit and the second radar data can depict the environment according to a second field of view of the second radar unit. As such, the first field of view partially overlaps with the second field of view similar to the examples shown in FIGS. 5A-5C.

The vehicle radar system may cause the first radar unit and the second radar unit to transmit radar signals using particular waveform parameters and according to a center frequency. For instance, some embodiments involve using a LFM signal, which is a "chirped" signal with its frequency changing linearly throughout the duration of the pulse. In some embodiments, any modulation and waveform parameters can be used and corrected to achieve a similar power difference test. For example, phase-shift keying (PSK) is a type of code-division multiplexing (CDMA) that can be used as the RF environments become more congested with automotive radars. In some instances, CDMA may be used to transmit signals at the same carrier frequency, which can remove the need for frequency compensation.

In addition, some examples involve receiving a first radar data cube from the first radar unit and a second radar data cube from the second radar unit where the first radar data cube includes first voxels indicating power measurements for surfaces in the first field of view of the first radar unit and the second radar data cube includes second voxels indicating power measurements for surfaces in the second field of view of the second radar unit.

At block 604, method 600 involves detecting a target object in both of the first radar data and the second radar data. In some examples, the computing device can identify, from the first radar data cube, first voxels that indicate power measurements for the target object and identify, from the second radar data cube, second voxels that indicate power measurements for the target object.

In some examples, the computing device may transform the first radar data into a vehicle frame based on first mount parameters for the first radar unit and the second radar data into the vehicle frame based on second mount parameters for the second radar unit. The computing device may detect the target object based on transforming the first radar data and the second radar data into the vehicle frame. Particularly, radar data may be initially obtained in a radar coordinate system for the receiving radar unit and the coordinate transformation into the vehicle frame may indicate a position of the object relative to the vehicle. For example, for forward-facing radars, the mount parameters for each radar may indicate an angle relative to a front portion of the vehicle.

At block 606, method 600 involves determining a first power level representing the target object based on the first radar data and a second power level representing the target object based on the second radar data. Some examples involve determining the first power level based on the first voxels and the second power level based on the second voxels.

In some examples, the computing device may further determine whether a detection of the target object exceeds a threshold signal-to-noise ratio. The computing device may then determine the first power level and the second power level based on determining that the detection of the target object exceeds the threshold signal-to-noise ratio.

At block 608, method 600 involves adjusting, using a sensitivity model, the first power level and the second power level. Some examples involve determining an azimuth offset based on first mount parameters for the first radar unit and second mount parameters for the second radar unit and generating the sensitivity model to include the azimuth offset. As such, the computing device may adjust the first power level and the second power level based on the azimuth offset. In addition, the computing device may also determine a frequency offset between the first radar data and the second radar data and adjust the first power level and the second power level based on the frequency offset. In some examples, the sensitivity model can be trained to factor the frequency offset.

At block 610, method 600 involves determining a power difference between the first power level and the second power level. For instance, the computing device may determine the power difference between the power levels based on adjusting the first power level and the second power level.

At block 612, method 600 involves performing a calibration process to decrease the power difference below the threshold power difference based on the power difference exceeding a threshold power difference. Some examples may involve adjusting a detection threshold for one or both radar units. This can reduce false detections that can arise. Similarly, other vehicle systems may be alerted about the degradation in radar performance, which can enable the vehicle radar system to adjust operations based on the degradation.

In some examples, the computing device may generate a first two-dimensional image based on the first radar data and a second two-dimensional image based on the second radar data. For instance, the first two-dimensional image may include bins representing power measurements for surfaces in the first field of view of the first radar unit and the second two-dimensional image may include bins representing power measurements for surfaces in the second field of view of the second radar unit. As such, the computing device may identify, from the first two-dimensional image, first bins that indicate power measurements for the target object and identifying, from the second two-dimensional image, second bins that indicate power measurements for the target object. The computing device may further determine that the first power level is greater than the second power level by at least the threshold power difference and provide an alert indicating information about the second radar unit, wherein the information includes at least the second power level.

In some examples, the computing device may determine that the first power level is greater than the second power level by at least the threshold power difference, detect precipitation on a radome for the second radar unit, and apply heat to the radome to remove the precipitation.

Some examples may further involve additional radars. For instance, the computing device may receive third radar data from a third radar unit where the third radar data depicts the environment according to a third field of view of the third radar unit. The third field of view partially overlaps with at least the first field of view or the second field of view. As such, the computing device may detect the target object in the third radar data and determine a third power level representing the target object based on the third radar data. The computing device may then perform a comparison between the first power level or the second power level and the third power level.

Figure 7:
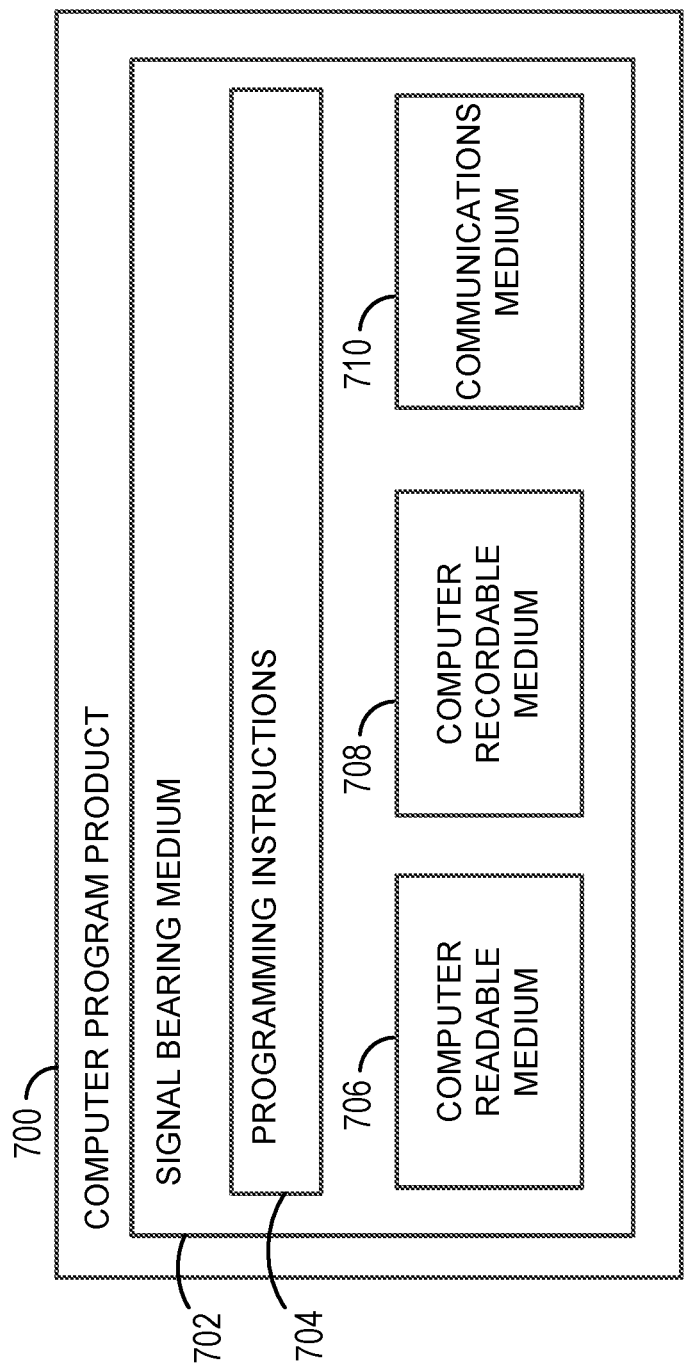
FIG. 7 is a schematic diagram of a computer program, according to one or more example embodiments.

FIG. 7 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 700 is provided using signal bearing medium 702, which may include one or more programming instructions 704 that, when executed by one or more processors may provide functionality or portions of the functionality described above with respect to FIGS. 1-6. In some examples, the signal bearing medium 702 may encompass a non-transitory computer-readable medium 706, such as, but not limited to, a hard disk drive, a Compact Disc (CD), a Digital Video Disk (DVD), a digital tape, memory, etc. In some implementations, the signal bearing medium 702 may encompass a computer recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (e.g., a fiber optic cable, a waveguide, a wired communications link, a wireless communication link, etc.).

Thus, for example, the signal bearing medium 702 may be conveyed by a wireless form of the communications medium 710.

The one or more programming instructions 704 may be, for example, computer executable and/or logic implemented instructions. In some examples, a computing device such as the computer system 112 of FIG. 1 may be configured to provide various operations, functions, or actions in response to the programming instructions 704 conveyed to the computer system 112 by one or more of the computer readable medium 706, the computer recordable medium 708, and/or the communications medium 710. Other devices may perform operations, functions, or actions described herein.

The non-transitory computer readable medium could also be distributed among multiple data storage elements, which could be remotely located from each other. The computing device that executes some or all of the stored instructions could be a vehicle, such as vehicle 100 illustrated in FIGS. 1-2E. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
   receiving, at a computing device coupled to a vehicle, first radar data from a first radar unit and second radar data from a second radar unit, wherein the first radar unit and the second radar unit are coupled to the vehicle,
      wherein the first radar data is generated based on first radar signals transmitted at a first center frequency and received by the first radar unit and depicts an environment according to a first field of view of the first radar unit,
      wherein the second radar data is generated based on second radar signals transmitted at a second center frequency and received by the second radar unit and depicts the environment according to a second field of view of the second radar unit, and
      wherein the first field of view partially overlaps with the second field of view;
   detecting, by the computing device, a target object in both of the first radar data and the second radar data;
   determining a first power level representing the target object based on the first radar data and a second power level representing the target object based on the second radar data;
   adjusting, by the computing device and using a sensitivity model, the first power level and the second power level, wherein the sensitivity model is configured to adjust the first power level and the second power level based on an azimuth offset between the first radar unit and the second radar unit and a frequency offset between the first center frequency and the second center frequency;
   based on adjusting the first power level and the second power level, determining a power difference between the first power level and the second power level; and
   based on the power difference exceeding a threshold power difference, performing a calibration process to decrease the power difference below the threshold power difference.

2. The method of claim 1, further comprising:
   causing the first radar unit and the second radar unit to transmit radar signals into the environment according to particular waveform parameters.

3. The method of claim 1, wherein receiving first radar data from the first radar unit and second radar data from the second radar unit comprises:
   receiving a first radar data cube from the first radar unit and a second radar data cube from the second radar unit, wherein the first radar data cube includes first voxels indicating power measurements for surfaces in the first field of view of the first radar unit and the second radar data cube includes second voxels indicating power measurements for surfaces in the second field of view of the second radar unit.

4. The method of claim 3, wherein detecting the target object in both of the first radar data and the second radar data comprises:
   identifying, from the first radar data cube, first voxels that indicate power measurements for the target object; and
   identifying, from the second radar data cube, second voxels that indicate power measurements for the target object.

5. The method of claim 4, wherein determining the first power level representing the target object based on the first radar data and the second power level representing the target object based on the second radar data comprises:
   determining the first power level based on the first voxels and the second power level based on the second voxels.

6. The method of claim 1, further comprising:
   determining an azimuth offset based on first mount parameters for the first radar unit and second mount parameters for the second radar unit;
   generating the sensitivity model to include the azimuth offset; and
   wherein adjusting the first power level and the second power level comprise:
   adjusting the first power level and the second power level based on the azimuth offset.

7. The method of claim 6, further comprising:
   determining a frequency offset between the first radar data and the second radar data;
   generating the sensitivity model to include the frequency offset; and
   wherein adjusting the first power level and the second power level comprises:
   adjusting the first power level and the second power level based on the frequency offset.

8. The method of claim 1, further comprising:
   based on detecting the target object in both of the first radar data and the second radar data, determining whether a detection of the target object exceeds a threshold signal-to-noise ratio; and
   wherein determining the first power level representing the target object based on the first radar data and the second power level representing the target object based on the second radar data comprises determining the first power level and the second power level based on determining that the detection of the target object exceeds the threshold signal-to-noise ratio.

9. The method of claim 1, further comprising:

generating a first two-dimensional image based on the first radar data and a second two-dimensional image based on the second radar data, wherein the first two-dimensional image includes bins representing power measurements for surfaces in the first field of view of the first radar unit and the second two-dimensional image includes bins representing power measurements for surfaces in the second field of view of the second radar unit; and wherein detecting the target object in both of the first radar data and the second radar data comprises:

identifying, from the first two-dimensional image, first bins that indicate power measurements for the target object; and identifying, from the second two-dimensional image, second bins that indicate power measurements for the target object.

10. The method of claim 1, wherein determining the power difference between the first power level and the second power level comprises:

determining that the first power level is greater than the second power level by at least the threshold power difference; and wherein performing the calibration process to decrease the power difference below the threshold power difference comprises:

providing an alert indicating information about the second radar unit, wherein the information includes at least the second power level.

11. The method of claim 1, wherein determining the power difference between the first power level and the second power level comprises:

determining that the first power level is greater than the second power level by at least the threshold power difference; and wherein performing the calibration process to decrease the power difference below the threshold power difference comprises:

detecting precipitation on a radome for the second radar unit; and applying heat to the radome to remove the precipitation.

12. The method of claim 1, further comprising:

receiving third radar data from a third radar unit, wherein the third radar data depicts the environment according to a third field of view of the third radar unit, wherein the third field of view partially overlaps with at least the first field of view or the second field of view;

detecting the target object in the third radar data; and determining a third power level representing the target object based on the third radar data; and wherein determining a power difference between the first power level and the second power level further comprises:

performing a comparison between the first power level, the second power level, and the third power level.

13. The method of claim 1, further comprising:

detecting, using sensor data from the first radar unit and the second radar unit, a plurality of objects in the environment; and training the sensitivity model based on detecting the plurality of objects, first mounting parameters for the first radar unit, and second mounting parameters for the second radar unit.

14. A system comprising:

a first radar unit and a second radar unit coupled to a vehicle, wherein the first radar unit operates according to a first field of view and the second radar unit operates according to a second field of view, and wherein the first field of view partially overlaps with the second field of view; and a computing device configured to:

receive first radar data from a first radar unit and second radar data from a second radar unit, wherein the first radar data is generated based on first radar signals transmitted at a first center frequency and received by the first radar unit, and wherein the second radar data is generated based on second radar signals transmitted at a second center frequency and received by the second radar unit;

detect a target object in both of the first radar data and the second radar data;

determine a first power level representing the target object based on the first radar data and a second power level representing the target object based on the second radar data;

adjust, using a sensitivity model, the first power level and the second power level, wherein the sensitivity model is configured to adjust the first power level and the second power level based on an azimuth offset between the first radar unit and the second radar unit and a frequency offset between the first center frequency and the second center frequency;

based on adjusting the first power level and the second power level, determine a power difference between the first power level and the second power level; and based on the power difference exceeding a threshold power difference, perform a calibration process to decrease the power difference below the threshold power difference.

15. The system of claim 14, wherein the computing device is further configured to:

transform the first radar data into a vehicle frame based on first mount parameters for the first radar unit;

transform the second radar data into the vehicle frame based on second mount parameters for the second radar unit; and detect the target object based on transforming the first radar data and the second radar data into the vehicle frame.

16. The system of claim 15, wherein the first mount parameters indicate a first angle of the first radar unit relative to a front portion of the vehicle and the second mount parameters indicate a second angle of the second radar unit relative to the front portion of the vehicle.

17. The system of claim 14, wherein the computing device is further configured to alert one or more vehicle systems to a reduced performance of the radar based on the power difference exceeding the threshold power difference.

18. The system of claim 14, wherein the computing device is further configured to adjust a detection threshold for at least one of the first radar unit and the second radar unit.

19. A non-transitory computer-readable medium configured to store instructions, that when executed by a computing system comprising one or more processors, causes the computing system to perform operations comprising:

receiving first radar data from a first radar unit and second radar data from a second radar unit,
  wherein the first radar data is generated based on first radar signals transmitted at a first center frequency and received by the first radar unit and depicts an environment according to a first field of view of the first radar unit,
  wherein the second radar data is generated based on second radar signals transmitted at a second center frequency and received by the second radar unit and depicts the environment according to a second field of view of the second radar unit, and
  wherein the first field of view partially overlaps with the second field of view;
detecting a target object in both of the first radar data and the second radar data;
determining a first power level representing the target object based on the first radar data and a second power level representing the target object based on the second radar data;
adjusting, using a sensitivity model, the first power level and the second power level, wherein the sensitivity model is configured to adjust the first power level and the second power level based on an azimuth offset between the first radar unit and the second radar unit and a frequency offset between the first center frequency and the second center frequency;
based on adjusting the first power level and the second power level, determining a power difference between the first power level and the second power level; and
based on the power difference exceeding a threshold power difference, performing a calibration process to decrease the power difference below the threshold power difference.

20. The non-transitory computer-readable medium of claim 19, further comprising:
responsive to receiving the first radar data from the first radar unit and the second radar data from the second radar unit, transforming the first radar data into a vehicle frame based on first mount parameters and the second radar data into the vehicle frame based on second mount parameters; and
wherein detecting the target object in both of the first radar data and the second radar data comprises:
detecting the target object based on transforming the first radar data and the second radar data into the vehicle frame.

* * * * *